(12) United States Patent
Basham

(10) Patent No.: US 6,430,645 B1
(45) Date of Patent: Aug. 6, 2002

(54) FIBRE CHANNEL AND SCSI ADDRESS MAPPING FOR MULTIPLE INITIATOR SUPPORT

(75) Inventor: Robert Beverley Basham, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/328,970

(22) Filed: Jun. 9, 1999

(51) Int. Cl.$^7$ ............................................... G06F 13/00
(52) U.S. Cl. .................... 710/305; 710/314; 710/39; 710/5; 710/52; 711/113; 711/164; 711/137; 711/173; 370/403
(58) Field of Search ................................. 710/39, 5, 52, 710/100, 128, 314; 370/403; 711/113, 164, 137, 173, 202, 129

(56) References Cited

U.S. PATENT DOCUMENTS

| | | | |
|---|---|---|---|
| 5,430,849 A | * | 7/1995 | Banks ........................ 710/128 |
| 5,640,541 A | | 6/1997 | Bartram et al. |
| 5,941,972 A | * | 8/1999 | Hoese et al. ................. 710/129 |
| 5,954,796 A | * | 9/1999 | McCarty et al. ............. 709/222 |
| 6,014,383 A | * | 1/2000 | McCarty ..................... 370/453 |
| 6,138,161 A | * | 10/2000 | Reynolds et al. ........... 709/227 |
| 6,209,023 B1 | * | 3/2001 | Dimitroff et al. ........... 709/211 |

* cited by examiner

Primary Examiner—Rupal Dharia
(74) Attorney, Agent, or Firm—Douglas R. Millett; Bracewell & Patterson, L.L.P.

(57) ABSTRACT

An improved and more efficient mapping scheme between a fiber channel (FC) interface and small computer system interface (SCSI) for multiple initiator support. In accordance with the method of the present invention an alternate mapping path is provided for processing commands from a FC host to a SCSI target while a single command is being processed therebetween through the normal mapping path. The alternate mapping path may be provided by designating another command pin(s) on the SCSI chip in the gateway or bridge box as an additional mapping address(es) or may be provided by using and coupling additional port(s) on each of the targets having multiple ports wherein the additional port(s) is/are associated with an additional mapping address (es).

16 Claims, 4 Drawing Sheets

FIBRE CHANNEL AND SCSI ADDRESS MAPPING FOR MULTIPLE INITIATOR SUPPORT

BACKGROUND OF THE INVENTION

1. Technical Field

The present invention relates in general to mapping between a fibre channel (FC) interface and small computer system interface (SCSI) for multiple initiator support and in particular to provide an improved and more efficient mapping scheme to map between FC and SCSI interfaces and improved interfaced communications between hosts and devices, particularly when multiple initiators exist.

2. Description of the Related Art

Fibre channel (FC) technology has been developed and continued to be increased in use as an interface technology. FC interface technology is quickly replacing SCSI interface technology, particularly for interfaces between open servers and disk/tape storage systems. Presently, many disk/tape storage systems do not provide a FC attachment or interface. In order to resolve this problem, IBM has developed the Storage Area Network (SAN) data gateway. The IBM® SAN data gateway is a hardware solution that enables communication between SCSI devices, such as SCSI targets, and FC devices, such as FC hosts. The IBM® SAN data gateway is described in detail in the following references: IBM Storage Area Network Data Gateway General Description Sheet (2 pages), by IBM Storage Systems Division, San Jose, Calif., February 1999; IBM SAN Data Gateway Installation and User's Guide 2108 Model G07, First Edition, by IBM Storage Systems Division, San Jose, Calif., pp. 1–83, March 1999; IBM 2108 Model G07 SAN Data Gateway Technical Course Book, First Edition, by IBM, pp. 1–65, March 1999. These references are incorporated by reference herein.

FIG. 1 shows a general diagram of a prior art SAN data gateway multi-host topology 10 that allows FC and SCSI interface communications. The SAN data gateway or bridge box 20 generally has a FC chip 22 on the FC side of the gateway 20 and a SCSI chip 24 on the SCSI side of the gateway 20. The FC chip 22 and SCSI chip 24 are coupled together forming a bridge with respect to communications between FC and SCSI. The FC chip 22 and SCSI chip 24 in communications with each other provide the address mapping between the hosts 16 and 18 and the targets 32 and 34. FIG. 1 further shows that the hosts 16 and 18 are coupled to the FC chip 22 at the FC side of the SAN data gateway 20. On the SCSI side of the gateway 20, Target 1 (target 36) is coupled from its port 32 through gateway port 28 and to the SCSI chip 24 while Target 2 (which is target 38) is coupled from its port 34 through gateway port 30 and to the SCSI chip 24.

For the prior art configuration shown in FIG. 1, problems exist when mapping of the multiple FC hosts 16 and 18 occurs on the FC side of a FC to a SCSI converter bridge of the gateway 20 into a single address (Address 1 or address 21) on the SCSI side of the SCSI converter bridge box or gateway 20 to Target 1 (target 36) or into a single address (Address 2 or address 23) on the SCSI side of the SCSI converter bridge box or gateway 20 to Target 2 (target 38). The multiple host configuration of FIG. 1 allows the hosts 16 and 18 to be able to respectively issue commands to the targets 36 and 38 at the same time. The present configuration only allows one FC host on the FC side to access and use at one time one SCSI target through each port in order to perform work or various tasks.

For example, in FIG. 1, if FC host 16 has reserved SCSI Target 36 or if FC host 16 has issued SCSI commands that take a long time (when sharing is done without a formal device reservation), then the SCSI Host Address 1 (or address 21) is tied up by the interface communications between FC host 16 and SCSI target 36 only. Since the single Address 1 (or address 21) is tied up, other commands from FC host 16 or commands from FC host 18 to the target 36 cannot yet be processed and have to be queued and processed in sequence after the Address 1 (or address 21) is no longer tied up and is finally freed up. The queuing of commands results in command timeouts. Each SCSI target 36 and 38 has a different command timeout for different commands. If one command takes a long time in execution while another command has a short timeout period (such as a "Request Sense") and the long command comes into the SCSI chip 24 to be processed before the short command, then the short command will not be able to be processed and will be timed out well before the long command is even done processing. A similar problem exists between FC host 18 and Target 2 (target 38) when Address 2 (address 23) is used and tied up by FC host 18 and Target 2 (target 38) when commands are processed therebetween.

It would therefore be advantageous and desirable to provide an improved and efficient address mapping scheme between FC and SCSI, particularly when multiple initiators are supported. It would also be advantageous and desirable to allow other commands to be processed through a FC and SCSI bridge box or gateway when a single command is being processed between a FC host and a SCSI target. It would further be advantageous and desirable to reduce command processing wait time through a FC and SCSI bridge box or gateway. It would still be further advantageous and desirable to avoid or minimize queuing of commands and prevent command timeouts of commands through a FC and SCSI bridge box or gateway.

SUMMARY OF THE INVENTION

It is therefore one object of the present invention to provide an improved and efficient address mapping scheme between FC and SCSI, particularly when multiple initiators are supported.

It is another object of the present invention to allow other commands to be processed through a FC and SCSI bridge box or gateway when a single command is being processed between a FC host and a SCSI target.

It is a further object of the present invention to reduce command processing wait time through a FC and SCSI bridge box or gateway.

It is still a further object of the present invention to avoid or minimize queuing of commands and prevent command timeouts of commands through a FC and SCSI bridge box or gateway.

The foregoing objects are achieved as is now described. An improved and more efficient mapping scheme between a fibre channel (FC) interface and small computer system interface (SCSI) for multiple initiator support. The present mapping scheme provides improved and more efficient mapping between FC and SCSI interfaces and provides improved interfaced communications between hosts and devices, particularly when multiple initiators exist. The present FC and SCSI mapping scheme allows other commands to be processed through a FC and SCSI bridge box or gateway 20 while a single command is being processed therebetween. The present mapping scheme and configuration reduce command processing wait time through a FC and SCSI bridge box or gateway 20. The present mapping scheme and configuration also avoid or minimize queuing of commands and prevent command timeouts of commands through a FC and SCSI bridge box or gateway 20. The basic concept of the present invention is to provide at least another alternate mapping path for processing other commands from a FC host to a SCSI target while a single command is being processed therebetween through the normal mapping path. The alternate mapping path may be provided by designating another command pin(s) on the SCSI chip in the gateway or bridge box as an additional mapping address(es) or may be provided by using and coupling additional port(s) on each of the targets having multiple ports wherein the additional port(s) is/are associated with an additional mapping address (es).

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is an improved and more efficient mapping scheme between a fibre channel (FC) interface and small computer system interface (SCSI) for multiple initiator support. The present invention provides improved and more efficient mapping between FC and SCSI interfaces, and it provides improved interfaced communications between hosts and devices, particularly when multiple initiators exist. The present FC and SCSI mapping scheme allows other commands to be processed through a FC and SCSI bridge box or gateway 20 when a single command is being processed. The present mapping scheme and configuration reduce command processing wait time through a FC and SCSI bridge box or gateway 20. The present mapping scheme and configuration also avoid or minimize queuing of commands and prevent command timeouts of commands through a FC and SCSI bridge box or gateway 20. The basic concept of the present invention is to provide at least another alternate mapping path for processing other commands from a FC host to a SCSI target when a single command is being processed therebetween.

Figure 2:
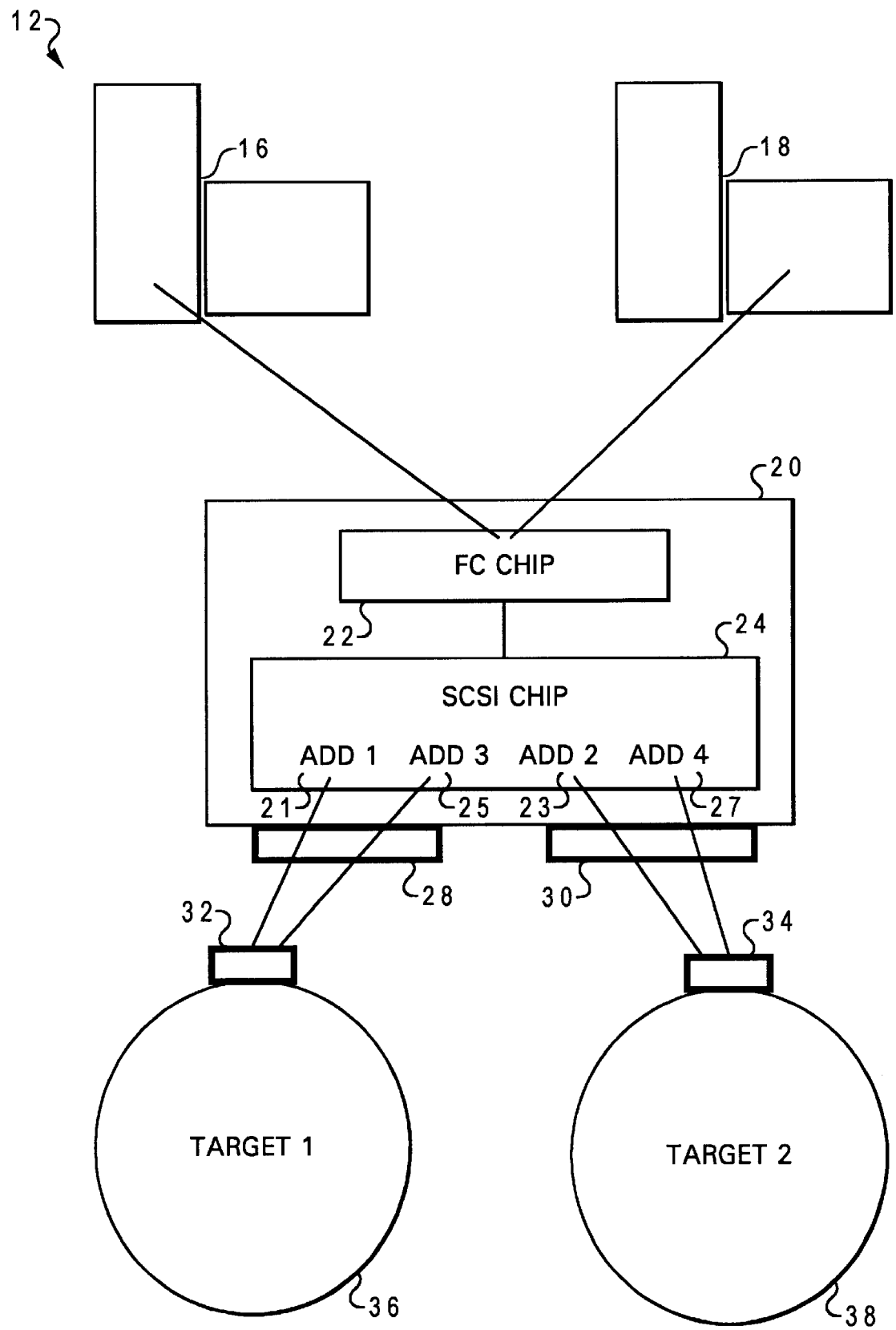
FIG. 2 is a block diagram of a first embodiment FC and SCSI interface communications topology for the present invention showing use of multiple mapping addresses for accessing and communicating and processing commands through a SAN data gateway or bridge box between FC hosts and SCSI targets.

With reference now to the figures and in particular with reference to FIG. 2, a block diagram of a first embodiment FC and SCSI interface communications topology 12 is shown. The first embodiment provides at least a second or alternative mapping address for or associated to each SCSI port. The topology 12 is similar to the topology 10. Topology 12 is shown to also have a SAN data gateway or bridge box 20. The gateway or bridge box 20 generally has a FC chip 22 on the FC side of the gateway 20 and a SCSI chip 24 on the SCSI side of the gateway 20. The FC chip 22 and SCSI chip 24 are coupled together forming a bridge with respect to communications between FC and SCSI. The FC chip 22 and SCSI chip 24 in communications with each other provide the mapping path between the hosts 16 and 18 and the targets 36 and 38. FIG. 2 further shows that the hosts 16 and 18 are coupled to the FC chip 22 at the FC side of the SAN data gateway 20. On the SCSI side of the gateway 20, Target 1 (target 36) is coupled from its port 32 through gateway port 28 and to the SCSI chip 24 while Target 2 (which is target 38) is coupled from its port 34 through gateway port 30 and to the SCSI chip 24.

Figure 1:
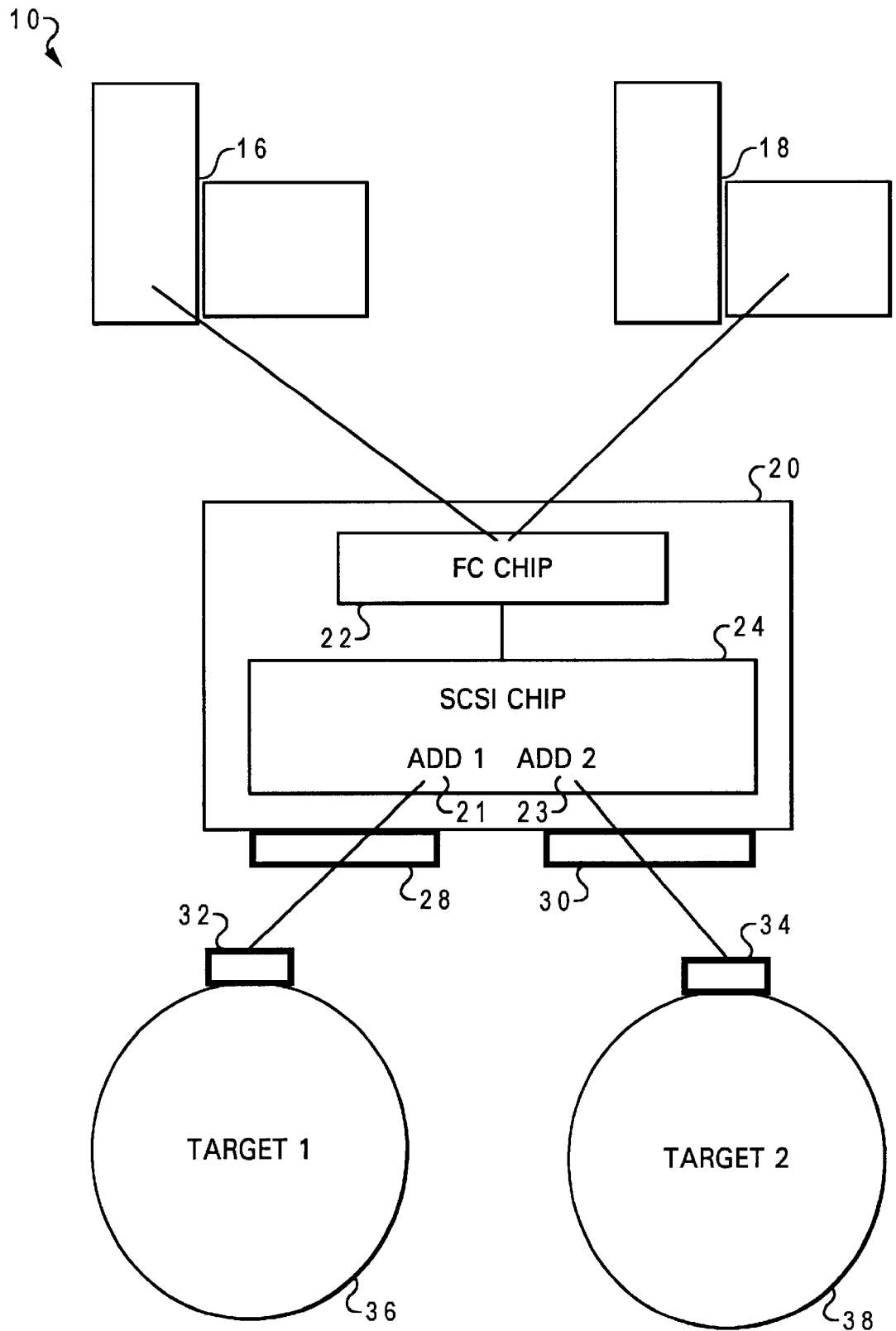
FIG. 1 is a prior art block diagram of a FC and SCSI interface communications topology showing a single address access and communications and processing commands through a SAN data gateway or bridge box between each FC host and each SCSI target.

Referring to FIG. 2, the topology 12, however, differs from topology 10 in that the mapping in topology it 12 occurs from the FC side to the SCSI side to at least two addresses for each target. In other words, Target 1 (target 36) is mapped and associated to Address 1 (address 21) and from Address 3 (address 25) while Target 2 (target 38) is mapped and associated to Address 2 (address 23) and Address 4 (address 27). This configuration in FIG. 2 is different since the configuration in FIG. 1 only has one address mapped and associated to each target and SCSI port (i.e. port 28 or 30) while the configuration has two addresses mapped and associated to each target and SCSI port (i.e. port 28 or 30). Thus, if one of the two addresses for one of the ports (i.e. port 28 or 30) is tied up or busy, then the other of the two addresses for that one port is still able to be used to process other commands from the respective host. For example, if the first address 21 (Address 1) is able to receive and process commands coming from the FC host 16 that has reserved the SCSI target 36, that is, the first address 21 (Address 1) is reserved by the FC host 16 to process commands to the SCSI target 36, then the second address 25 (Address 3) is still able to be used to process commands from the host 16 to the target 36. Alternatively, the first address 21 (Address 1) may be designated and reserved as an address for processing long commands while the second address 25 (Address 3) may be designated and reserved as an address for processing short or shorter commands. Therefore, the other commands from the host 16 are reduced or prevented from being timed out when the first address 21 (Address 1) is being used since these commands are able to be processed using the alternate mapping path or address 25 (Address 3). Thus, overall interfaced communications processing is increased since the alternate mapping path or address 25 (Address 3) exists. Also, with the addition of at least a second or alternate mapping address, the commands are prevented or minimized from being put on a queue for processing. A similar example is provided by address 23 (Address 2) and a second or alternate address 27 (Address 4) between FC host 16 and/or 18 and SCSI Target 2 (target 38).

In this first embodiment, the second address 25 or 27 is simply created by using and designating another command pin on the SCSI chip 24 for use as a second address 25 or 27. However, the present invention is not limited to the specific manner of creating this second address, and any suitable method or system may be used to provide an additional address or addresses for processing commands. Also, an alternate mapping address for each SCSI port (i.e. port 28 or 30) and not necessarily for each target is needed for the above implementation since the commands placed on the alternate mapping address will generally be processed quickly.

Figure 3:
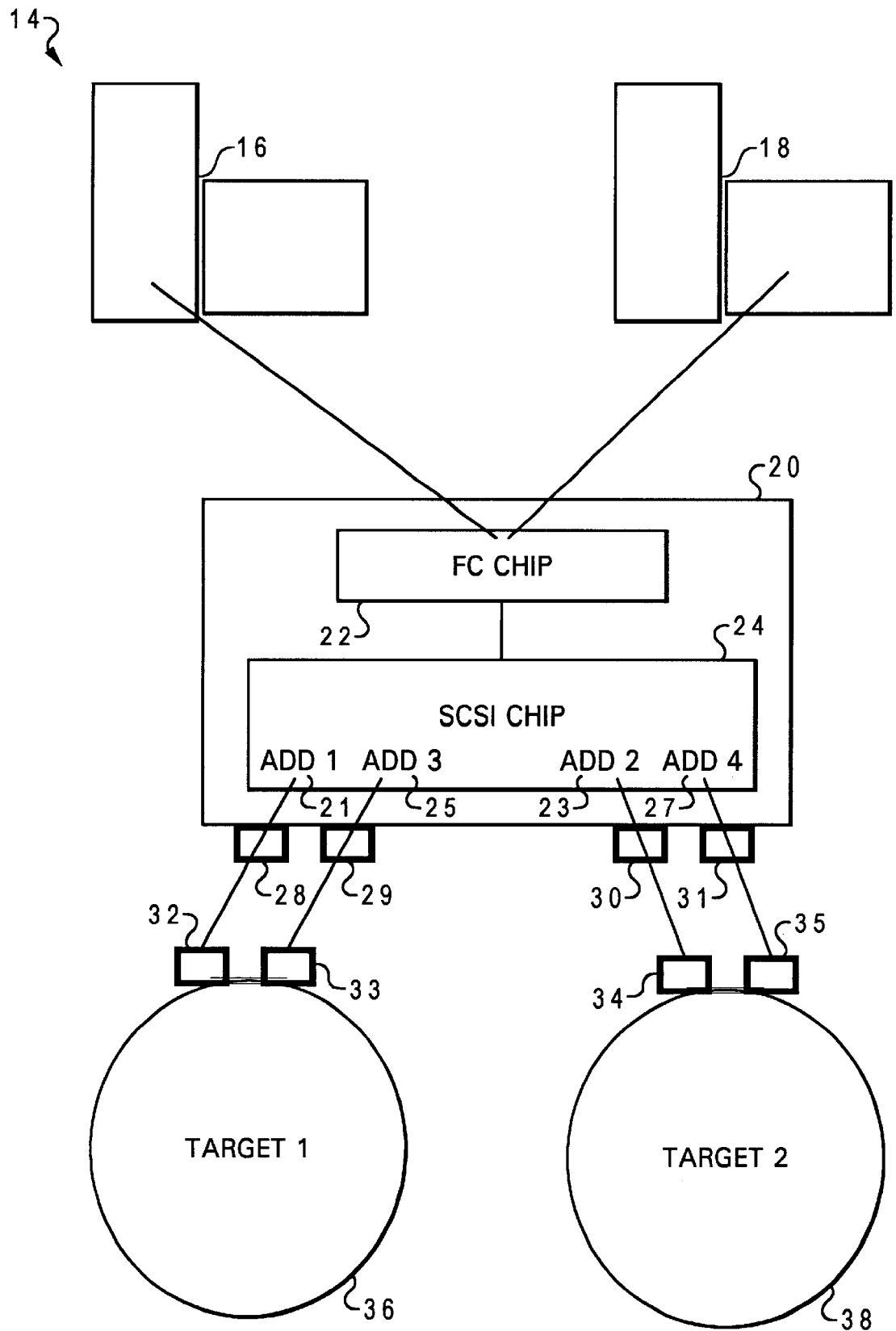
FIG. 3 is a block diagram of a second embodiment FC and SCSI interface communications topology for the present invention showing use of multiple ports of the targets and multiple ports at the SAN data gateway or bridge box associated with respective mapping addresses for accessing and communicating and processing commands therethrough.

With reference now to the figures and in particular with reference to FIG. 3, a block diagram of a second embodiment FC and SCSI interface communications topology 14 is shown. The second embodiment provides at least a second or alternative mapping path by using and coupling the multiple ports from the SCSI targets to the SCSI chip 24 and mapping the ports to mapping addresses at the SCSI chip. The topology 14 is also similar to the topology 10. Topology 14 is shown to also have a SAN data gateway or bridge box 20. The gateway or bridge box 20 generally has a FC chip 22 on the FC side of the gateway 20 and a SCSI chip 24 on the SCSI side of the gateway 20. The FC chip 22 and SCSI chip 24 are coupled together forming a bridge with respect to communications between FC and SCSI. The FC chip 22 and SCSI chip 24 in communications with each other provide the mapping path between the hosts 16 and 18 and the targets 36 and 38. FIG. 3 further shows that the hosts 16 and 18 are coupled to the FC chip 22 at the FC side of the SAN data gateway 20.

The topology 14, however, differs from topology 10 in that, on the SCSI side of the gateway 20, Target 1 (target 36) is coupled from its multiple ports 32 and 33 through respective gateway ports 28 and 29 to the SCSI chip 24 while Target 2 (which is target 38) is coupled from its multiple ports 34 and 35 through respective gateway ports 30 and 31 to the SCSI chip 24. In this second embodiment, commands are processed from the host to the target via the target ports. Thus, if a command is being processed from FC host 16 to SCSI target 36 through port 32 which is associated to address 21 (Address 1), then another command or commands from FC host 16 is/are able to be processed to SCSI target 36 through port 33 which is associated to address 25 (Address 3). For example, if the first port 32 which is associated to address 21 (Address 1) is able to receive and process commands coming from the FC host 16 that has reserved the SCSI target 36, that is, the first port 32 which is associated to address 21 (Address 1) is reserved by the FC host 16 to process commands to the SCSI target 36, then the second port 33 which is associated to address 25 (Address 3) is still able to be used to process commands from the host 16 to the target 36. Alternatively, the first port 32 may be designated and reserved as a mapping path through address 21 (Address 1) for processing long commands while the second port 33 may be designated and reserved as a mapping path through address 25 (Address 3) for processing short or shorter commands. Therefore, the other commands from the host 16 are reduced or prevented from being timed out when the first port 32 and address 21 (Address 1) are being used or tied up since these commands are able to be processed using the alternate port 33 through address 25 (Address 3). Thus, overall interfaced communications processing is increased since the alternate port 33 with associated mapping address 25 (Address 3) exists. Also, with the use of other ports mapped to other respective mapping addresses, the commands are reduced or minimized from being put on a queue for processing. A similar example is provided by port 34 associated to mapping address 23 (Address 2) and a second or alternate port 35 associated to mapping address 27 (Address 4) between FC host 16 and/or 18 and SCSI Target 2 (target 38).

In this second embodiment, multiple ports are used to associate to alternative mapping addresses. However, the present invention is not limited to the specific manner of using multiple ports or associating these ports with alternative mapping addresses, and any suitable method or system may be used to provide additional mapping paths or to assign alternative mapping addresses for processing commands.

Figure 4:
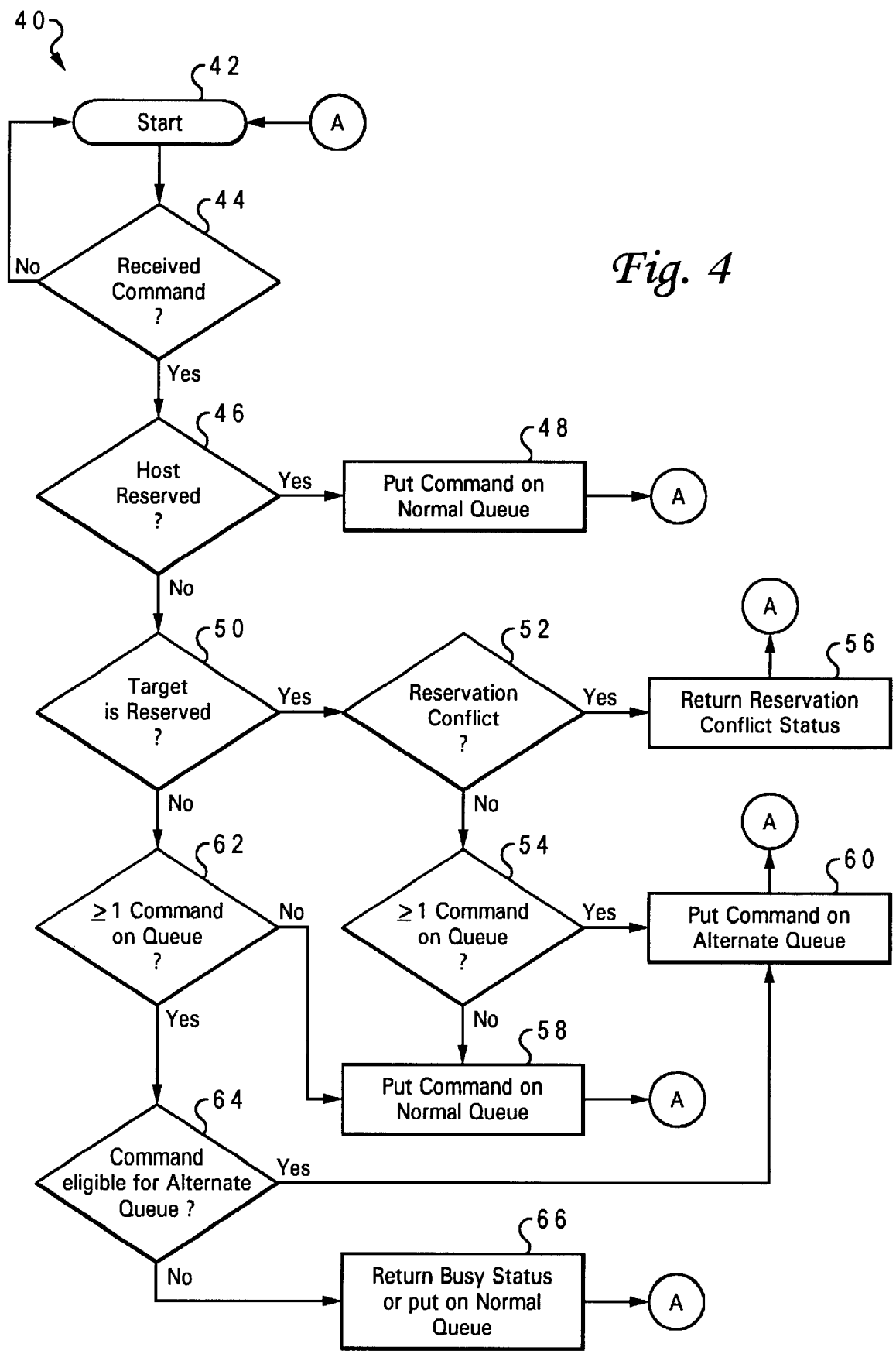
FIG. 4 is a flowchart algorithm for the SAN data gateway or bridge box implementing the present invention FC and SCSI address mapping scheme for multiple initiator support in providing FC and SCSI interfaced communications between FC hosts and SCSI devices through the gateway or bridge box.

With reference now to the figures and in particular with reference to FIG. 4, a flowchart algorithm 40 for the SAN data gateway or bridge box 20 implementing the present invention FC and SCSI address mapping scheme for multiple initiator support is shown. The flowchart algorithm 40 is implemented to provide FC and SCSI interfaced communications between FC hosts and SCSI devices through the gateway or bridge box 20. The algorithm 40 starts at block 42. The gateway or bridge box 20 determines whether it has received a command from a host (such as host 16 or 18) at decision block 44. If the gateway or bridge box 20 has not received a command, then the algorithm 40 loops back to the start block 42. If the gateway or bridge box 20 has received a command from a host, then the algorithm 40 moves to decision block 46.

At decision block 46, the gateway or bridge box 20 determines whether a host has reserved the target (such as the Target 1 or Target 2) for processing commands. If the host has reserved the respective target, then the algorithm 40 moves to block 48 wherein the command is placed on the normal queue (or normal mapping path or address) to be processed therethrough, and the algorithm 40 then loops back to the start block 42 via connector A. However, if the host has not reserved the respective target for processing commands at decision block 46, then the algorithm 40 moves to decision block 50.

At decision block 50, the gateway or bridge box 20 determines whether the target has been reserved by a host. If the target has not been reserved, then the algorithm 40 moves to decision block 62 and the other following blocks which will be discussed later in more detail. If the target has been reserved, then the algorithm 40 moves to decision block 52. At decision block 52, the gateway or bridge box 20 determines whether a reservation conflict exists. If such a reservation conflict exists, then the algorithm 40 moves to block 56 where a reservation conflict status is returned to the host. The algorithm 40 then loops back to the start block 42 via connector A. On the other hand, if such a reservation conflict does not exist, then the algorithm 40 moves to decision block 54. At decision block 54, the gateway or bridge box 20 determines whether there is one or more command on the queue. If one or more command does not exist on the queue, then the command is put on and processed through the normal queue (i.e. normal mapping path or address) at block 58, and the algorithm 40 loops back to the start block 42 via connector A. If one or more command does exist on the queue, then the command is put on and processed through an alternate queue (i.e. alternate mapping path or address) at block 60, and the algorithm 40 loops back to the start block 42 via connector A.

As stated earlier, if the target is not reserved at decision block 50, then the algorithm 40 moves to decision block 62.

At decision block 62, the gateway or bridge box 20 determines whether one or more command is on the queue. If one or more command does not exist on the queue, then the command is put on and processed through the normal queue (i.e. normal mapping path or address) at block 58, and the algorithm 40 loops back to the start block 42 via connector A. On the other hand, if one or more command does exist on the queue, then the algorithm 40 moves to decision block 64. At decision block 64, the gateway or bridge box 20 determines whether the command is eligible to be placed on and processed by the alternate queue. If the command is eligible, then the algorithm 40 moves to block 60 where the command is placed on the alternate queue (i.e. alternate mapping path or address), and the algorithm 40 loops back to the start block 42 via connector A. If the command is not eligible, then the algorithm 40 moves to block 66 where either a busy status is returned to the host or the command is placed on the normal queue, and the algorithm 40 loops back to the start block 42 via connector A.

While the invention has been particularly shown and described with reference to a preferred embodiment, it will be understood by those skilled in the art that various changes in form and detail may be made therein without departing from the spirit and scope of the invention.

What is claimed is:

1. A mapping scheme method between a fibre channel interface and a small computer system interface wherein a bridge box couples and bridges the fibre channel interface and the small computer system interface and wherein at least one host is coupled to the fibre channel interface and at least one target is coupled to the small computer system interface comprising the steps of
    providing a normal path and at least an alternative path through the bridge box for processing mapping commands between one of the at least one target and one of the at least one host,
    using the normal path of the one of the at least one target to process the commands from the one of the at least one host when the normal path is available, including:
        coupling one of multiple ports from the one of the at least one target to one of a number of bridge box ports of the bridge box wherein the one of a number of bridge box ports is mapped and associated to a normal address, and
        using the normal address to process the commands, and
    using the at least an alternative path of the one of the at least one target to process the commands from the one of the at least one host when the normal path is not available and the at least an alternative path is available and the commands are able to use the at least an alternative path.

2. The mapping scheme method according to claim 1 wherein the step of using the normal path further comprises the step of:
    providing a normal address mapped and associated to the one of the at least one target wherein the normal address is on a side near the small computer system interface of the bridge box.

3. The mapping scheme method according to claim 1 wherein the step of using the at least an alternative path further comprises the steps of:
    providing an alternative address mapped and associated to the one of the at least one target wherein the alternative address is on a side near the small computer system interface of the bridge box, and
    using the alternative address to process the commands.

4. The mapping scheme method according to claim 1 wherein the one of the at least one target has multiple ports and wherein the step of using the at least an alternative path further comprises the step of:
    coupling one of the multiple ports from the one of the at least one target to one of a number of bridge box ports of the bridge box wherein the one of a number of bridge box ports is mapped and associated to an alternative address, and
    using the alternative address to process the commands.

5. A mapping scheme bridge box between a fibre channel interface and a small computer system interface wherein the bridge box couples and bridges the fibre channel interface and the small computer system interface and wherein at least one host is coupled to the fibre channel interface and at least one target is coupled to the small computer system interface comprising:
    a fibre channel chip coupled to the fibre channel interface,
    a small computer system interface chip coupled to the small computer system interface and further coupled to the fibre channel chip for bridging the fibre channel interface and the small computer system interface,
    a normal mapping path provided through the small computer system interface chip between one of the at least one host and one of the at least one target for processing mapping commands therethrough, wherein the normal mapping path is a normal mapping address associated with one of a number of ports on the one of the at least one target, and
    at least an alternative mapping path provided through the small computer system interface chip between the one of the at least one host and the one of the at least one target for processing the mapping commands therethrough.

6. The mapping scheme bridge box according to claim 5 wherein the normal mapping path is a normal mapping address designated on a command pin of the small computer system interface chip.

7. The mapping scheme bridge box according to claim 6 wherein the at least an alternative mapping path is an alternative mapping address designated on another command pin of the small computer system interface chip.

8. The mapping scheme bridge box according to claim 5 wherein the at least an alternative mapping path is an alternative mapping address associated with another of a number of ports on the one of the at least one target.

9. A method of operating a mapping scheme bridge box between a fibre channel interface and a small computer system interface wherein the bridge box couples and bridges the fibre channel interface and the small computer system interface and wherein at least one host is coupled to the fibre channel interface and at least one target is coupled to the small computer system interface comprising the steps of:
    receiving a mapping command from one of the at least one host,
    determining whether the one of the at least one host has reserved one of the at least one target,
    placing and processing the mapping command on a normal mapping path if the one of the at least one host has reserved the one of the at least one target,
    determining whether the one of the at least one target is reserved if the one of the at least one host has not reserved the one of the at least one target,
    determining whether a reservation conflict exists for the one of the at least one target if the one of the at least one target has been reserved, returning a reservation conflict status to the one of the at least one host if the reservation conflict exists, determining whether at least one command is on the normal mapping path if the reservation conflict does not exist, placing and processing the mapping command on the normal mapping path if at least one command is not on the normal mapping path, placing and processing the mapping command on an alternative mapping path if at least one command is on the normal mapping path, determining whether at least one command is on the normal mapping path if the one of the at least one target has not been reserved, placing and processing the mapping command on the normal mapping path if at least one command is not on the normal mapping path, determining whether the mapping command is able to be processed on the alternative mapping path if at least one command is on the normal mapping path, and placing and processing the mapping command on the alternative mapping path if the command is able to be processed thereon.

10. The method according to claim 9 further comprising the step of:

returning a busy status to the one of the at least one host if the command is not able to be processed on the alternative mapping path.

11. The method according to claim 9 further comprising the step of: placing and processing the mapping command on the normal mapping path if the command is not able to be processed on the alternative mapping path.

12. The method according to claim 9 wherein the normal mapping path is a normal mapping address associated with the small computer system interface.

13. The method according to claim 9 wherein the alternative mapping path is an alternative mapping address associated with the small computer system interface.

14. The method according to claim 9 wherein the normal mapping path is a normal mapping address associated with one of a number of ports on the one of the at least one target.

15. The method according to claim 9 wherein the alternative mapping path is an alternative mapping address associated with one of a number of ports on the one of the at least one target.

16. The method according to claim 9 wherein the method steps are repeated for a number of mapping commands.

* * * * *